(12) United States Patent
Tokuno et al.

(10) Patent No.: US 12,742,506 B2
(45) Date of Patent: Sep. 22, 2026

(54) VALVE ASSEMBLY

(71) Applicant: JTEKT CORPORATION, Kariya (JP)

(72) Inventors: Tetsuya Tokuno, Kashihara (JP); Natsuki Iwamoto, Okazaki (JP); Toshikatsu Kubo, Obu (JP); Kazushi Numazaki, Toyota (JP); Tsunehito Watanabe, Ichinomiya (JP)

(73) Assignee: JTEKT CORPORATION, Kariya (JP)

( * ) Notice: Subject to any disclaimer, the term of this patent is extended or adjusted under 35 U.S.C. 154(b) by 35 days.

(21) Appl. No.: 18/867,838

(22) PCT Filed: May 30, 2022

(86) PCT No.: PCT/JP2022/021953
§ 371 (c)(1),
(2) Date: Nov. 21, 2024

(87) PCT Pub. No.: WO2023/233469
PCT Pub. Date: Dec. 7, 2023

(65) Prior Publication Data
US 2025/0361942 A1 Nov. 27, 2025

(51) Int. Cl.
*F16K 11/22* (2006.01)
*F16K 11/10* (2006.01)
(Continued)

(52) U.S. Cl.
CPC ............ *F16K 11/22* (2013.01); *F16K 11/105* (2013.01); *F17C 13/04* (2013.01); *F16K 11/24* (2013.01);
(Continued)

(58) Field of Classification Search
CPC ........ F16K 11/22; F16K 11/105; F16K 11/24; F16K 15/025; F16K 31/0655;
(Continued)

(56) References Cited

U.S. PATENT DOCUMENTS 4,838,527 A * 6/1989 Holley .................. F16F 9/3264 267/119
2001/0018929 A1 9/2001 Taku
(Continued)

FOREIGN PATENT DOCUMENTS

JP 2001-317645 A 11/2001
JP 2004-92712 A 3/2004
(Continued)

OTHER PUBLICATIONS

International Search Report issued Aug. 2, 2022 in PCT/JP2022/021953, filed on May 30, 2022, 2 pages.
(Continued)

*Primary Examiner* — Patrick C Williams
(74) *Attorney, Agent, or Firm* — Oblon, McClelland, Maier & Neustadt, L.L.P.

(57) ABSTRACT

A valve assembly includes a body and a plurality of valve subassemblies. The valve subassemblies include a safety valve having an inlet and another valve. The body has a gas flow passage including a first flow passage connected to a gas tank and a second flow passage connected to an external device, and an integrated attachment hole that communicates with each of the first flow passage and the second flow passage. The integrated attachment hole includes a first attachment hole that is open in an outer surface of the body and is configured such that the safety valve is attached, and a second attachment hole that is open in a bottom surface of the first attachment hole and is configured such that the other valve is attached. The inlet is configured to communicate with the first flow passage regardless of an open or closed state of the other valve.

5 Claims, 3 Drawing Sheets

(51) Int. Cl.
*F16K 11/24* (2006.01)
*F17C 13/04* (2006.01)

(52) U.S. Cl.
CPC ................. *F17C 2205/0326* (2013.01); *F17C 2205/0332* (2013.01); *F17C 2205/0394* (2013.01); *F17C 2221/012* (2013.01); *F17C 2270/0168* (2013.01); *F17C 2270/0184* (2013.01)

(58) Field of Classification Search
CPC .... F16K 31/0693; F16K 17/383; F16K 17/38; F16K 17/40; F17C 13/04; F17C 2205/0326; F17C 2205/0332; F17C 2205/0394; F17C 2205/0146; F17C 2205/0335; F17C 2205/0382; F17C 2205/0385; F17C 2221/012; F17C 2270/0168; F17C 2270/0184; F17C 2201/0109; F17C 2223/0123; F17C 2223/036; F17C 2250/0439; F17C 2260/042
See application file for complete search history.

(56) References Cited

U.S. PATENT DOCUMENTS

2005/0150566 A1* 7/2005 Funt ........................ F17C 13/04 141/2
2006/0042617 A1* 3/2006 Stevens ................... F17C 13/04 124/74
2010/0326540 A1* 12/2010 Moretti ................... F17C 13/04 137/468
2012/0132298 A1 5/2012 Ishitoya et al.
2015/0184805 A1 7/2015 Lee
2016/0305562 A1 10/2016 Kagomoto et al.
2018/0038507 A1* 2/2018 Ninomiya .......... F02M 21/0233
2020/0292135 A1* 9/2020 Frenal ....................... F17C 5/00

FOREIGN PATENT DOCUMENTS

JP 2005-76862 A 3/2005
JP 2011-12780 A 1/2011
JP 2013-53659 A 3/2013
JP 2015-523509 A 8/2015
JP 2016-205418 A 12/2016
JP 2019-87476 A 6/2019

OTHER PUBLICATIONS

International Search Report issued Aug. 1, 2023 in PCT/JP2023/017705, filed on May 11, 2023, 2 pages.

Japanese Office Action issued Nov. 18, 2025, in corresponding Japanese Patent Application No. 2024-524530 (English Translation only), 4 pages.

* cited by examiner

GAS TANK
2
11
11c
14
141
145
L1, L2
181
162
(161)
151
142
143
163
(161)
94
91 (26)
95
96
97
166
171
144
152
172
153
164
(161)
174
154
165
118
(117)
122
15
116
119
(117)
121
112
104
92
(26)
S
111
31
(22)
113
115
102
114
103
101
131
35
(23)

VALVE ASSEMBLY

CROSS-REFERENCE TO RELATED APPLICATIONS

This application is national stage application of International Application No. PCT/JP2022/021953, filed on May 30, 2022, which designates the United States, the entire contents of which is incorporated herein by reference.

TECHNICAL FIELD

The present disclosure relates to a valve assembly.

BACKGROUND ART

For example, Patent Document 1 discloses a valve assembly for controlling a gas flow. Such a valve assembly is mounted to, for example, a gas tank of a fuel cell electric vehicle to control a hydrogen gas flow.

The valve assembly of Patent Document 1 includes a body and a plurality of valve subassemblies attached to the body. The valve subassembly includes a safety valve (also called a pressure relief device) that releases a hydrogen gas in the gas tank to the outside when the temperature is high. In addition to the safety valve, the valve subassembly includes a non-return valve (also called a check valve) that restricts outflow of a hydrogen gas from the gas tank, and an electromagnetic valve that controls feeding of a hydrogen gas to the fuel cell. The body has a gas flow passage through which a hydrogen gas flows, and a plurality of attachment holes for attaching the plurality of valve subassemblies. The plurality of valve subassemblies is attached to the corresponding attachment holes to form the valve assembly.

RELATED ART DOCUMENTS

Patent Documents

Patent Document 1: Japanese Unexamined Patent Application Publication (Translation of PCT Application) No. 2015-523509 (JP 2015-523509 A)

SUMMARY OF THE INVENTION

Problem to be Solved by the Invention

In the valve assembly of Patent Document 1, the plurality of attachment holes is provided in the body as holes independent of one another. Thus, the body structure is likely to be complex.

Means for Solving the Problem

One aspect of the present disclosure provides a valve assembly. The valve assembly includes a body and a plurality of valve subassemblies configured to be attached to the body. The plurality of valve subassemblies includes a safety valve having an inlet and configured to release a gas flowing into the inlet to an outside when a temperature of the safety valve exceeds a threshold temperature, and another valve configured to control a flow of the gas in a manner different from a manner of the safety valve. The body includes a gas flow passage including a first flow passage connected to a gas tank and a second flow passage connected to an external device, and an integrated attachment hole that communicates with each of the first flow passage and the second flow passage. The integrated attachment hole includes a first attachment hole that is open in an outer surface of the body and is configured such that the safety valve is attached, and a second attachment hole that is open in a bottom surface of the first attachment hole and is configured such that the other valve is attached. The inlet is configured to communicate with the first flow passage regardless of an open or closed state of the other valve.

MODES FOR CARRYING OUT THE INVENTION

A valve assembly according to one embodiment will be described below with reference to the drawings.

The term "tubular" as used herein refers to the shape of any object that may be considered as tubular as a whole, including a plurality of components or parts combined to form a tubular shape and an object with a notch etc. in part, such as a C-shaped object. The "tubular" shape includes, but is not limited to, a circular shape, an elliptical shape, and a polygonal shape with sharp or rounded corners when viewed in the axial direction. The term "annular" as used herein refers to the shape of any object that may be considered as annular as a whole, including a plurality of components or parts combined to form an annular shape and an object with a notch etc. in part, such as a C-shaped object. The "annular" shape includes, but is not limited to, a circular shape, an elliptical shape, and a polygonal shape with sharp or rounded corners when viewed in the axial direction.

(Overall Structure)

Figure 1:
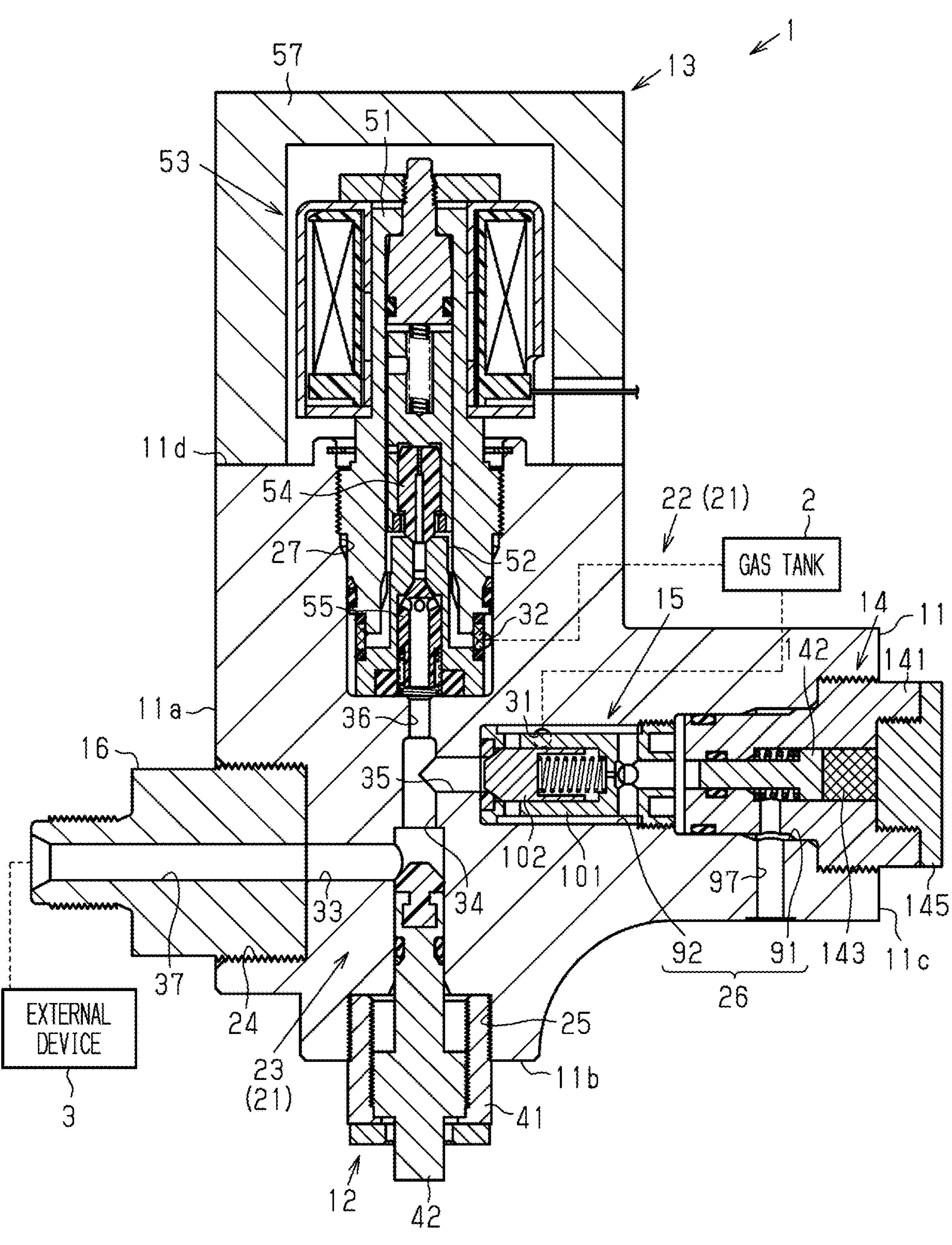
FIG. 1 is a sectional view of a valve assembly according to one embodiment.

A valve assembly 1 illustrated in FIG. 1 is mounted to, for example, a gas tank 2 of a fuel cell electric vehicle and connected to an external device 3 via a pipe (not illustrated). The external device 3 includes a fuel cell mounted on the automobile and a hydrogen gas supply source such as a hydrogen station. The gas tank 2 stores a hydrogen gas at a high pressure of about 72.5 MPa, for example. The valve assembly 1 controls flows of a hydrogen gas to be charged into the gas tank 2 and a hydrogen gas fed out of the gas tank 2.

Specifically, the valve assembly 1 includes a body 11 and a plurality of valve subassemblies attached to the body 11. The plurality of valve subassemblies includes, for example, a manual valve 12, a composite valve 13, a safety valve 14, and a check valve 15. The plurality of valve subassemblies may include any valve subassembly in addition to or instead of these valve subassemblies. As in the illustration, the valve assembly 1 may further include a joint 16 for connecting a pipe.

The body 11 is made of, for example, a metal material. The body 11 has, for example, a rectangular parallelepiped shape with projections in part. The outer surface of the body 11 includes a first side surface 11*a*, a second side surface 11*b*, a third side surface 11*c*, and a fourth side surface 11*d*. The first side surface 11*a* and the third side surface 11*c* are, for example, parallel to each other. The second side surface 11*b* and the fourth side surface 11*d* are, for example, parallel to each other. The first side surface 11*a* and the third side surface 11*c* are, for example, orthogonal to the second side surface 11*b* and the fourth side surface 11*d*.

The body 11 has a gas flow passage 21 through which a hydrogen gas flows, and a plurality of attachment holes associated with members to be attached to the body 11. The gas flow passage 21 includes a first flow passage 22 that connects the check valve 15 to the gas tank 2 to form a charging passage and connects the gas tank 2 to the composite valve 13 to form a feeding passage, and a second flow passage 23 that connects the composite valve 13 and the check valve 15 to the external device 3 via the joint 16. The plurality of attachment holes includes, for example, a joint attachment hole 24 for attaching the joint 16, a manual valve attachment hole 25 for attaching the manual valve 12, an integrated attachment hole 26 for attaching the safety valve 14 and the check valve 15, and a composite valve attachment hole 27 for attaching the composite valve 13.

More specifically, the joint attachment hole 24 is open in the first side surface 11*a*. The joint attachment hole 24 is, for example, a round hole. The bottom surface of the joint attachment hole 24 is, for example, a flat surface parallel to the first side surface 11*a*. The manual valve attachment hole 25 is open in the second side surface 11*b*. The manual valve attachment hole 25 is, for example, a round hole. The bottom surface of the manual valve attachment hole 25 is, for example, a flat surface parallel to the second side surface 11*b*. The integrated attachment hole 26 is open in the third side surface 11*c*. The integrated attachment hole 26 will be described in detail later. The composite valve attachment hole 27 is open in the fourth side surface 11*d*. The composite valve attachment hole 27 is, for example, a round hole. The bottom surface of the composite valve attachment hole 27 is a flat surface parallel to the fourth side surface 11*d*.

The first flow passage 22 includes a charging portion 31 that communicates the integrated attachment hole 26 with the gas tank 2, and a feeding portion 32 that communicates the composite valve attachment hole 27 with the gas tank 2. The charging portion 31 is open in, for example, the inner circumferential surface of the integrated attachment hole 26. The feeding portion 32 is open in, for example, the inner circumferential surface of the composite valve attachment hole 27.

The second flow passage 23 includes a first portion 33 extending from the bottom surface of the joint attachment hole 24, and a second portion 34 extending from the bottom surface of the manual valve attachment hole 25. The first portion 33 and the second portion 34 extend, for example, linearly. The second portion 34 is orthogonal to the first portion 33. The bore diameter of the second portion 34 on a far side from the intersection with the first portion 33 is smaller than the bore diameter of the second portion 34 on a near side to the intersection. That is, the second portion 34 has a stepped portion.

The second flow passage 23 further includes a third portion 35 that communicates the second portion 34 with the integrated attachment hole 26, and a fourth portion 36 that communicates the second portion 34 with the composite valve attachment hole 27. The third portion 35 is open in, for example, the bottom surface of the integrated attachment hole 26. The fourth portion 36 is open in, for example, the bottom surface of the composite valve attachment hole 27. The third portion 35 and the fourth portion 36 extend, for example, linearly. As in the illustration, the third portion 35 is orthogonal to, for example, the small diameter portion of the second portion 34. That is, the second flow passage 23 may extend in a crank shape from the joint attachment hole 24 toward the integrated attachment hole 26. The fourth portion 36 is provided, for example, coaxially with the second portion 34. However, the third portion 35 is not limited to this, and may be orthogonal to the second portion 34 so as to be disposed, for example, coaxially with the first portion 33. The fourth portion 36 may be orthogonal to, for example, the second portion 34.

The joint 16 has, for example, a columnar shape. The joint 16 is fixed to the joint attachment hole 24 by any fixing method such as screw fastening or press fitting. The joint 16 has a joint passage 37 that communicates with the first portion 33 of the second flow passage 23. A pipe (not illustrated) extending from the external device 3 is connected to the joint 16. In this way, the second flow passage 23 is connected to the external device 3. The joint 16 may include a valve mechanism such as an excess flow check valve incorporated in the joint passage 37.

The manual valve 12 includes a manual valve housing 41 and a manual valve body 42. The manual valve housing 41 has, for example, a tubular shape. The manual valve housing 41 is fixed to the manual valve attachment hole 25 by any fixing method such as screw fastening or press fitting. The manual valve body 42 has, for example, a columnar shape. The manual valve body 42 is housed in the manual valve housing 41, for example, by screw fastening so as to be movable along the second portion 34 of the second flow passage 23 and to be able to keep its position in the manual valve housing 41.

In the manual valve 12 structured in this way, the tip of the manual valve body 42 abuts against the stepped portion of the second portion 34 to restrict the flow of the hydrogen gas between the first portion 33 and the second portion 34. The tip of the manual valve body 42 moves away from the stepped portion of the second portion 34 to allow the flow of the hydrogen gas between the first portion 33 and the second portion 34.

The safety valve 14 has an inlet 165 described later. When the temperature of the safety valve 14 is equal to or lower than a threshold temperature, the safety valve 14 is in a closed state in which the hydrogen gas flowing into the inlet 165 is not released to the outside. When the temperature of the safety valve 14 exceeds the threshold temperature, the safety valve 14 irreversibly changes from the closed state to an open state. In the open state, the safety valve 14 releases the hydrogen gas flowing into the inlet 165 to the outside. The threshold temperature is preset so that the pressure of the hydrogen gas in the gas tank 2 does not become excessive and damage the gas tank 2. The safety valve 14 will be described in detail later.

The check valve 15 prevents backflow of the gas charged into the gas tank 2, and restricts the flow of the hydrogen gas from the charging portion 31 of the first flow passage 22 to the third portion 35 of the second flow passage 23 and allows the flow of the hydrogen gas from the third portion 35 to the charging portion 31. That is, the check valve 15 corresponds to another valve configured to control the flow of the hydrogen gas in a manner different from that of the safety valve 14. The check valve 15 will be described in detail later.

The composite valve 13 is attached to the composite valve attachment hole 27. The composite valve 13 has a function of an electromagnetic valve and a function of a check valve. The composite valve 13 controls the flow of the hydrogen gas between the feeding portion 32 of the first flow passage 22 and the fourth portion 36 of the second flow passage 23. The composite valve 13 will be described in detail later.

(Composite Valve 13)

Figure 2:
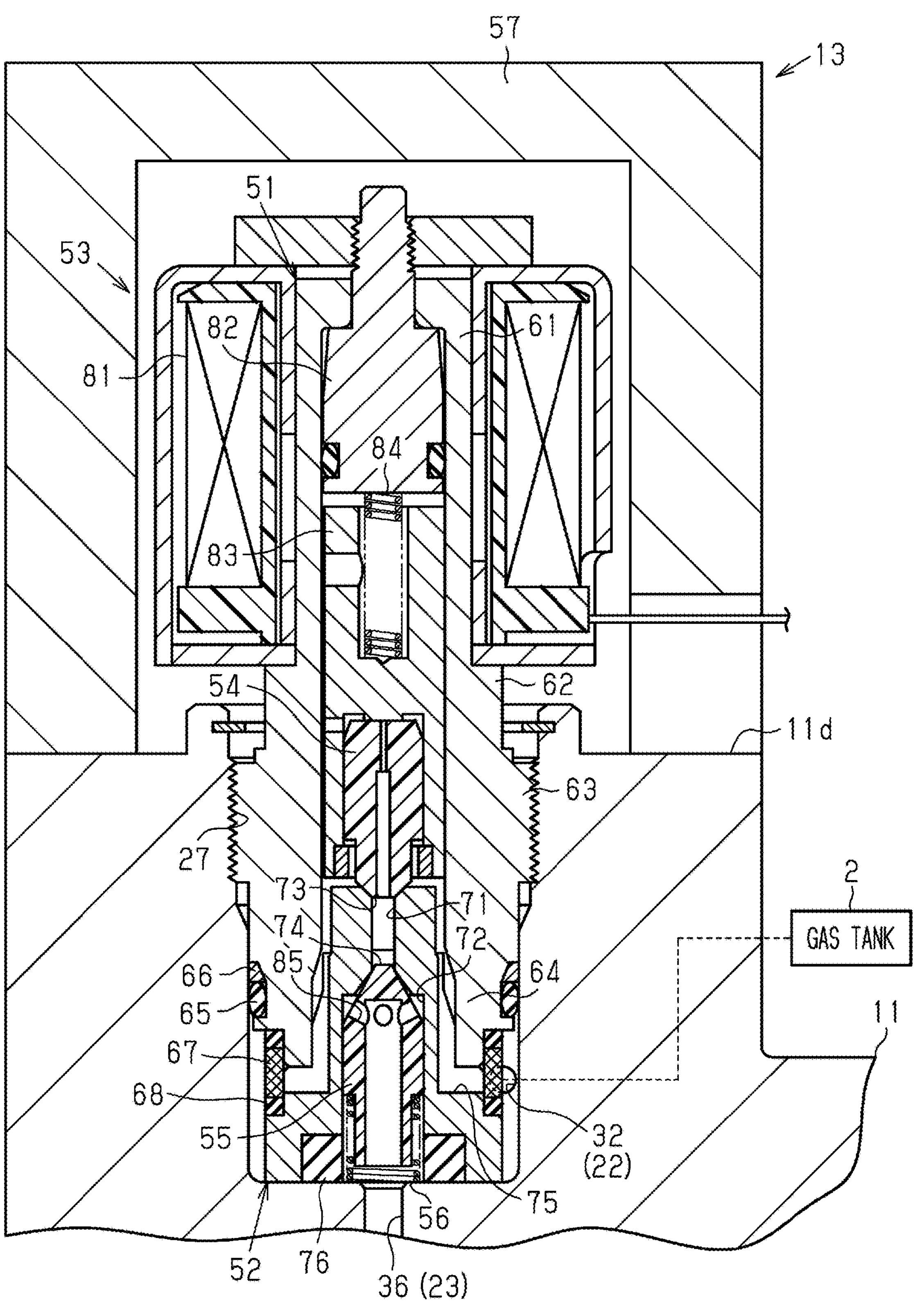
FIG. 2 is an enlarged sectional view of the vicinity of a composite valve in the valve assembly in FIG. 1.

As illustrated in FIG. 2, the composite valve 13 includes a sleeve 51, a plug 52, a solenoid actuator 53, an electromagnetic valve body 54, a check valve body 55, and a check valve biasing member 56. The composite valve 13 may further include a cover 57.

In the composite valve 13, the sleeve 51, the plug 52, the solenoid actuator 53, and the electromagnetic valve body 54 implement the function of the electromagnetic valve that controls the flow of the hydrogen gas between the first flow passage 22 and the second flow passage 23. The plug 52, the check valve body 55, and the check valve biasing member 56 allow the flow of the hydrogen gas from the first flow passage 22 to the second flow passage 23, and restrict the flow of the hydrogen gas from the second flow passage 23 to the first flow passage 22. This implements the function of the check valve for preventing a high pressure from acting on the electromagnetic valve when charging the hydrogen gas etc.

Specifically, the sleeve 51 has, for example, a tubular shape with one closed end. The sleeve 51 has a stepped shape in which its outside diameter varies stepwise along the axial direction. Specifically, the sleeve 51 includes, in order from one end side, a small diameter portion 61, an intermediate portion 62, a large diameter portion 63, and a tip portion 64. The outside diameter of the small diameter portion 61 is smaller than the outside diameter of the intermediate portion 62. The outside diameter of the intermediate portion 62 is smaller than the outside diameter of the large diameter portion 63. The outside diameter of the tip portion 64 is smaller than the outside diameter of the large diameter portion 63.

The sleeve 51 is fixed to the composite valve attachment hole 27 by any fixing method such as screw fastening or press fitting. When the sleeve 51 is fixed by screw fastening, it can be removed from the body 11. When the sleeve 51 is attached to the composite valve attachment hole 27, the large diameter portion 63 and the tip portion 64 are inserted into the composite valve attachment hole 27, and the small diameter portion 61 and the intermediate portion 62 protrude from the body 11. A seal member 65 and a backup ring 66 are provided on the outer circumferential surface of the large diameter portion 63. This provides a seal between the inner circumferential surface of the composite valve attachment hole 27 and the large diameter portion 63.

The plug 52 has, for example, a stepped columnar shape. The plug 52 is fixed to the tip portion 64 of the sleeve 51 and disposed between the sleeve 51 and the bottom surface of the composite valve attachment hole 27. The plug 52 is fixed to the tip portion 64 by, for example, press fitting or screw fastening so as to be movable together with the sleeve 51. For example, as in the illustration, the plug 52 is fixed so as to be disposed coaxially with the sleeve 51. A filter 67 and a seal member 68 may be provided between the sleeve 51 and the outer circumferential edge of the plug 52.

The plug 52 has an internal flow passage 71 and a housing hole 72 that is continuous with the internal flow passage 71. The internal flow passage 71 includes a first opening 73 to be opened and closed by the electromagnetic valve body 54, and a second opening 74 to be opened and closed by the check valve body 55. The internal flow passage 71 has, for example, a linear shape along the axis of the plug 52. The outer circumferential surface of the plug 52 is provided with one or more communication grooves 75 that extend so as to communicate the inside and the outside of the sleeve 51. Thus, the first opening 73 communicates with the feeding portion 32 of the first flow passage 22 via the communication groove 75. The second opening 74 communicates with the fourth portion 36 of the second flow passage 23 via the housing hole 72. A seal member 76 is provided between the plug 52 and the bottom surface of the composite valve attachment hole 27. This provides a seal between the bottom surface of the composite valve attachment hole 27 and the plug 52.

The solenoid actuator 53 includes a solenoid coil 81, a fixed core 82, a movable core 83, and an electromagnetic valve biasing member 84.

The solenoid coil 81 has, for example, a cylindrical shape. The solenoid coil 81 is fixed to the outer circumference of the small diameter portion 61. The fixed core 82 is made of a magnetic material. The fixed core 82 is fixed in the sleeve 51. The movable core 83 is made of a magnetic material. The movable core 83 has, for example, a columnar shape. The movable core 83 is slidable in the axial direction within the sleeve 51. The movable core 83 is connected to the electromagnetic valve body 54 so as to be slidable in the axial direction together with the electromagnetic valve body 54. The electromagnetic valve body 54 is made of, for example, a resin material.

A known pilot valve mechanism is incorporated in the movable core 83 of the present embodiment. Therefore, only the movable core 83 moves before the movable core 83 and the electromagnetic valve body 54 move together, thereby allowing a small amount of the hydrogen gas to flow from the feeding portion 32 of the first flow passage 22 to the internal flow passage 71. Another embodiment may be such that the pilot valve mechanism is not incorporated in the movable core 83 and the electromagnetic valve body 54 is fixed to the movable core 83 so that the electromagnetic valve body 54 is slidable in the axial direction completely together with the movable core 83.

The electromagnetic valve body 54 is biased toward the first opening 73 of the plug 52 via the movable core 83 by the electromagnetic valve biasing member 84. The electromagnetic valve biasing member 84 is, for example, a compression coil spring. When the electromagnetic valve body 54 is seated on the circumferential edge of the first opening 73, the first opening 73 is closed. When the electromagnetic valve body 54 moves away from the circumferential edge of the first opening 73, the first opening 73 is opened. That is, the circumferential edge of the first opening 73 of the plug 52 is used as a valve seat for the electromagnetic valve body 54.

The check valve body 55 is made of, for example, a resin material. The check valve body 55 has, for example, a tubular shape with one closed end. The check valve body 55 is housed in the housing hole 72 of the plug 52 so as to be slidable in the axial direction. That is, the check valve body 55 is disposed on the opposite side of the electromagnetic valve body 54 from the plug 52. The tubular portion of the check valve body 55 has lateral holes 85 passing therethrough in the radial direction. The check valve body 55 is biased toward the second opening 74 of the plug 52 by the check valve biasing member 56. The check valve biasing member 56 is, for example, a compression coil spring. When the check valve body 55 is seated on the circumferential edge of the second opening 74, the second opening 74 is closed. When the check valve body 55 moves away from the circumferential edge of the second opening 74, the second opening 74 is opened. That is, the circumferential edge of the second opening 74 of the plug 52 is used as a valve seat for the check valve body 55.

The cover 57 is made of, for example, a metal material or a resin material. The cover 57 has, for example, a tubular shape with one closed end. The cover 57 houses a portion of the composite valve 13 exposed from the composite valve attachment hole 27. The cover 57 is fixed to the fourth side surface 11*d* of the body 11 by a known fixing method such as a bolt or a snap-fit structure (not illustrated).

In the composite valve 13 structured in this way, when no electric power is supplied to the solenoid coil 81, the electromagnetic valve body 54 is seated on the circumferential edge of the first opening 73 by the biasing force of the electromagnetic valve biasing member 84, and the first opening 73 is closed. In this state, the check valve body 55 is seated on the circumferential edge of the second opening 74 by the biasing force of the check valve biasing member 56, and the second opening 74 is closed. In this way, the composite valve 13 is in a closed state when the solenoid coil 81 is not energized. Therefore, the flow of the hydrogen gas from the feeding portion 32 of the first flow passage 22 to the fourth portion 36 of the second flow passage 23 is restricted.

When electric power is supplied to the solenoid coil 81, the electromagnetic valve body 54 is attracted to the fixed core 82 together with the movable core 83 to move away from the circumferential edge of the first opening 73, and the first opening 73 is opened. Then, the check valve body 55 is moved away from the circumferential edge of the second opening 74 by the pressure of the hydrogen gas flowing into the internal flow passage 71, and the second opening 74 is opened. In this way, the composite valve 13 is in an open state when the solenoid coil 81 is energized. Therefore, the flow of the hydrogen gas from the feeding portion 32 of the first flow passage 22 to the fourth portion 36 of the second flow passage 23 is allowed.

(Integrated Attachment Hole 26)

Figure 3:
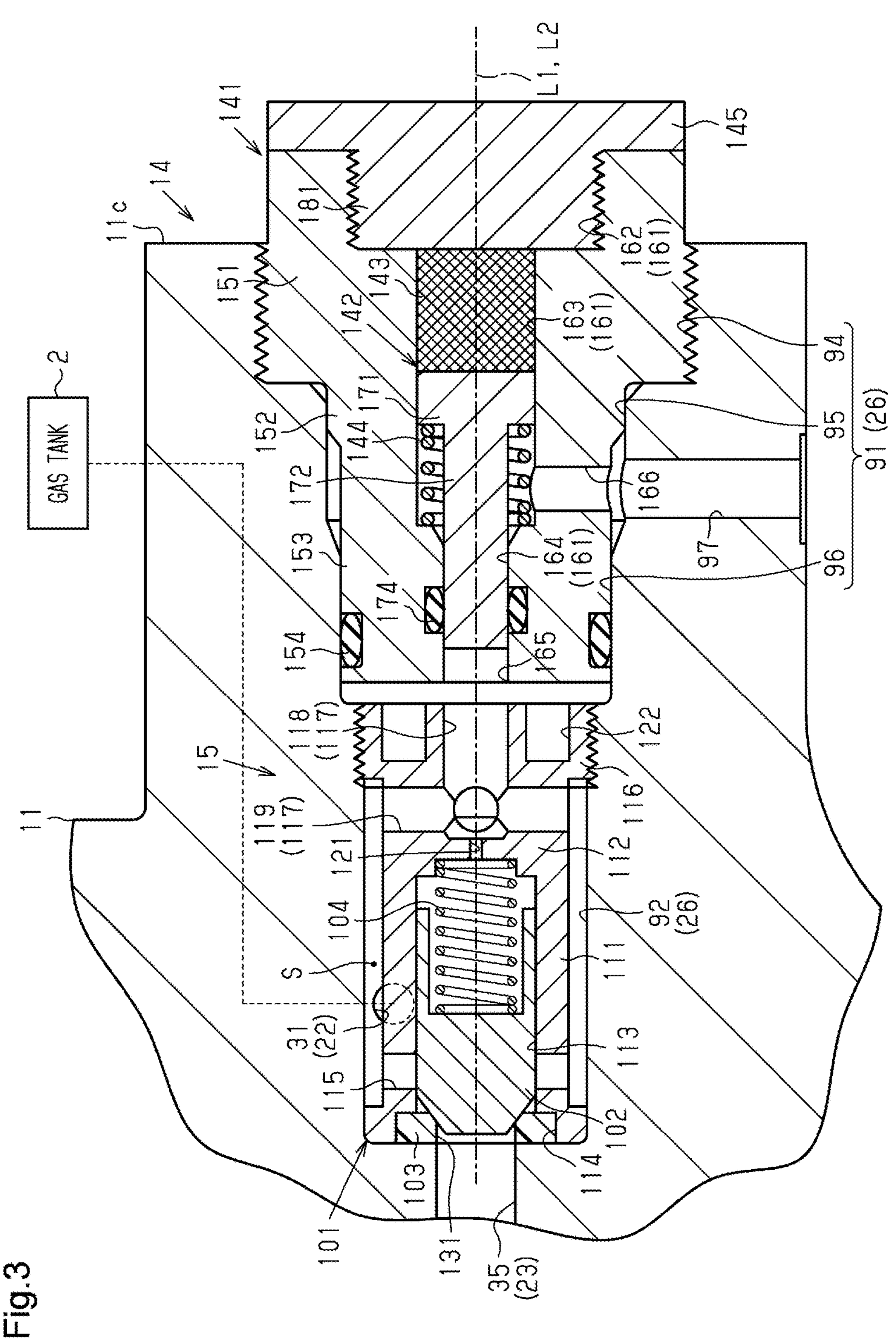
FIG. 3 is an enlarged sectional view of the vicinity of a safety valve and a check valve in the valve assembly in FIG. 1.

As illustrated in FIG. 3, the integrated attachment hole 26 includes a first attachment hole 91 to which the safety valve 14 is attached, and a second attachment hole 92 to which the check valve 15 that is the other valve is attached. The first attachment hole 91 is open in the third side surface 11*c* that is the outer surface of the body 11. The second attachment hole 92 is open in the bottom surface of the first attachment hole 91. That is, the second attachment hole 92 is provided on a deep side of the first attachment hole 91 so as to be aligned linearly with the first attachment hole 91. In the following description, the side on which the first attachment hole 91 is disposed with respect to the second attachment hole 92 will be referred to as a first side, and the opposite side, that is, the side on which the second attachment hole 92 is disposed with respect to the first attachment hole 91, will be referred to as a second side.

For example, as in the illustration, the first attachment hole 91 is a stepped hole having a bore diameter that decreases stepwise toward the second side. Specifically, the first attachment hole 91 includes, in order from the first side, a large diameter hole portion 94, a medium diameter hole portion 95, and a small diameter hole portion 96. The bore diameter of the first attachment hole 91 decreases in the order of the large diameter hole portion 94, the medium diameter hole portion 95, and the small diameter hole portion 96. The large diameter hole portion 94 is open in the third side surface 11*c*. Internal threads are provided on the inner circumferential surface of the large diameter hole portion 94. A release passage 97 is open in the inner circumferential surface of the medium diameter hole portion 95. The release passage 97 extends, for example, in a direction orthogonal to an axis L1 of the first attachment hole 91, and is open in the outer surface of the body 11. The small diameter hole portion 96 communicates with the second attachment hole 92. The bottom surfaces of the large diameter hole portion 94 and the small diameter hole portion 96 are, for example, flat surfaces parallel to the third side surface 11*c*. The bottom surface of the medium diameter hole portion 95 is, for example, a tapered surface having a bore diameter that gradually decreases toward the second side.

For example, as in the illustration, the second attachment hole 92 has a substantially constant bore diameter over the entire length along an axis L2. Internal threads are provided at the end of the inner circumferential surface of the second attachment hole 92 on the first side. The bottom surface of the second attachment hole 92 is, for example, a flat surface parallel to the third side surface 11*c*. The second attachment hole 92 is open in the bottom surface of the first attachment hole 91 and is therefore continuous with the small diameter hole portion 96. The charging portion 31 of the first flow passage 22 that constitutes the outlet of the check valve 15 is open in the inner circumferential surface of the second attachment hole 92, and the third portion 35 of the second flow passage 23 that constitutes the inlet of the check valve 15 is open in the bottom surface of the second attachment hole 92. As described above, the second attachment hole 92 is not open in the outer surface of the body 11. In other words, the body 11 does not have an opening for the second attachment hole 92 on its outer surface. The second attachment hole 92 is provided coaxially with the first attachment hole 91. That is, the axis L2 of the second attachment hole 92 coincides with the axis L1 of the first attachment hole 91.

(Check Valve 15)

The check valve 15 includes a check valve housing 101 and a check valve body 102. The check valve 15 may further include a valve seat 103 and a check valve biasing member 104.

The check valve housing 101 defines a space S between the check valve housing 101 and the inner circumferential surface of the second attachment hole 92. The check valve housing 101 has, for example, a tubular shape with a closed end on the first side. Specifically, the check valve housing 101 includes a tubular portion 111 and an end wall portion 112 provided at the end of the tubular portion 111 on the first side. The inside of the tubular portion 111 serves as a housing hole 113 that is open to the second side. An enlarged diameter hole portion 114 is provided at the end of the housing hole 113 on the second side. The bore diameter of the enlarged diameter hole portion 114 is set larger than the bore diameter of the portion of the housing hole 113 on the first side. The outside diameter of the tubular portion 111 is set smaller than the bore diameter of the second attachment hole 92 except for the end on the second side. The outside diameter of the end of the tubular portion 111 on the second side is set substantially equal to the bore diameter of the second attachment hole 92. The tubular portion 111 has one or more lateral holes 115 passing therethrough in the radial direction. The lateral hole 115 is provided on the first side with respect to the end of the tubular portion 111 on the second side.

The end wall portion 112 includes a threaded portion 116. External threads are provided on the outer circumferential surface of the threaded portion 116. The threaded portion 116 is provided, for example, on the end of the end wall portion 112 on the first side. The outside diameter of the end wall portion 112 is set smaller than the bore diameter of the second attachment hole 92 except for the threaded portion 116. For example, as in the illustration, the outside diameter of the end wall portion 112 except the threaded portion 116 may be equal to the outside diameter of the tubular portion

111. The check valve housing 101 is fixed immovably in the second attachment hole 92 by screw fastening of the threaded portion 116 to the second attachment hole 92. Thus, the tubular space S that communicates with the first flow passage 22 is formed between the inner circumferential surface of the second attachment hole 92 and the outer circumferential surface of the check valve housing 101.

The end wall portion 112 has a communication passage 117 that communicates, via the space S, the charging portion 31 (the outlet of the check valve) of the first flow passage 22 with the safety valve 14 in the first attachment hole 91. For example, as in the illustration, the communication passage 117 includes a vertical passage 118 extending along the axis L2, and one or more lateral passages 119 orthogonal to the axis L2. One end of the lateral passage 119 is open in the outer circumferential surface of the end wall portion 112, and the other end of the lateral passage 119 is open to the vertical passage 118. The end of the vertical passage 118 on the first side constitutes the inlet of the safety valve 14 and is open in the bottom surface of the first attachment hole 91. The end of the vertical passage 118 on the first side may be referred to as the outlet of the check valve 15 on the safety valve 14 side.

The end wall portion 112 further has a back pressure hole 121 that communicates the housing hole 113 with the communication passage 117. The back pressure hole 121 has, for example, a linear shape extending parallel to the vertical passage 118. The end wall portion 112 may have one or more tool holes 122 to which a tool (not illustrated) is fitted. The tool holes 122 may be, for example, open to the first side and provided at equiangular intervals around the vertical passage 118.

The valve seat 103 is made of, for example, a resin material. The valve seat 103 has an annular shape. The valve seat 103 has a valve port 131 passing therethrough along the axis L2. The valve seat 103 is disposed in the enlarged diameter hole portion 114 of the check valve housing 101. The valve seat 103 is sandwiched between the bottom surface of the second attachment hole 92 and the check valve housing 101 by fixing the check valve housing 101 into the second attachment hole 92. Thus, the space between the bottom surface of the second attachment hole 92 and the check valve housing 101 is sealed by the valve seat 103.

The check valve body 102 is made of, for example, a metal material. The check valve body 102 has, for example, a columnar shape. The check valve body 102 is configured to open or close the valve port 131 of the valve seat 103. For example, the end of the check valve body 102 on the second side has a tapered shape having an outside diameter that gradually decreases toward the second side. The check valve body 102 is slidably housed in the housing hole 113 of the check valve housing 101. The check valve biasing member 104 is, for example, a compression coil spring. The check valve biasing member 104 is disposed in the housing hole 113 so as to bias the check valve body 102 to the second side.

The check valve 15 structured in this way is brought into a closed state when the check valve body 102 is seated on the valve seat 103 and the valve port 131 is closed. Thus, the check valve 15 restricts the flow of the hydrogen gas between the charging portion 31 of the first flow passage 22 and the third portion 35 of the second flow passage 23. The check valve 15 is brought into an open state when the check valve body 102 moves away from the valve seat 103 and the valve port 131 is opened. Thus, the check valve 15 allows the flow of the hydrogen gas between the charging portion 31 and the third portion 35.

(Safety Valve 14)

The safety valve 14 includes a safety valve housing 141, a safety valve body 142, and a plug body 143. The safety valve 14 may further include a safety valve biasing member 144 and a fastener 145.

The safety valve housing 141 has, for example, a stepped columnar shape. Specifically, the safety valve housing 141 includes, in order from the first side, a head portion 151, a fitting portion 152, and a shaft portion 153. The outside diameter of the safety valve housing 141 decreases in the order of the head portion 151, the fitting portion 152, and the shaft portion 153. External threads are provided on the head portion 151. The external threads are provided, for example, at the end of the outer circumference of the head portion 151 on the second side. The outer circumferential surface of the end of the head portion 151 on the first side may have a polygonal shape that can engage with a tool (not illustrated). The safety valve housing 141 is fixed to the first attachment hole 91 by screw fastening of the head portion 151 to the large diameter hole portion 94.

The outside diameter of the fitting portion 152 is set substantially equal to the bore diameter of the medium diameter hole portion 95 of the first attachment hole 91. The outside diameter of the shaft portion 153 is set substantially equal to the bore diameter of the small diameter hole portion 96 of the first attachment hole 91. A seal member 154 is provided at the end of the outer circumferential surface of the shaft portion 153 on the second side. This provides a seal between the small diameter hole portion 96 and the shaft portion 153 of the safety valve housing 141.

The length of the shaft portion 153 along the axis L1 is set larger than the length of the small diameter hole portion 96 along the axis L1. Thus, part of the shaft portion 153 is disposed in the medium diameter hole portion 95 with the safety valve housing 141 attached to the first attachment hole 91. When the safety valve housing 141 is attached to the first attachment hole 91, a clearance may be formed between the shaft portion 153 and the check valve housing 101 as in the illustration, or the shaft portion 153 may abut against the check valve housing 101.

The safety valve housing 141 has a through hole 161 passing therethrough along the axis L1. For example, as in the illustration, the through hole 161 is a stepped hole having a bore diameter that decreases stepwise toward the second side. Specifically, the through hole 161 includes, in order from the first side, a first hole portion 162, a second hole portion 163, and a third hole portion 164. The bore diameter of the through hole 161 decreases in the order of the first hole portion 162, the second hole portion 163, and the third hole portion 164. Internal threads are provided on the inner circumferential surface of the first hole portion 162. A seal member 174 is provided on the inner circumferential surface of the third hole portion 164. The end of the third hole portion 164 on the second side is used as the inlet 165 of the safety valve 14. The inlet 165 faces the communication passage 117 of the check valve housing 101. Thus, the inlet 165 communicates with the charging portion 31 of the first flow passage 22 via the communication passage 117 and the space S. As described above, the check valve 15 switches the open and closed states when the check valve body 102 moves in the housing hole 113, but the movement of the check valve body 102 does not change the structures of the communication passage 117 and the space S. Therefore, the inlet 165 communicates with the first flow passage 22 regardless of the open or closed state of the check valve 15 that is the other valve.

The safety valve housing 141 further has a communication hole 166. The communication hole 166 extends linearly, for example, in a direction orthogonal to the axis L1. One end of the communication hole 166 is open in the inner circumferential surface of the second hole portion 163, and the other end of the communication hole 166 is open in a portion of the outer circumferential surface of the shaft portion 153 that is disposed in the medium diameter hole portion 95. Thus, the inside of the second hole portion 163 communicates with the outside via the communication hole 166 and the release passage 97.

The safety valve body 142 has, for example, a stepped columnar shape. Specifically, the safety valve body 142 includes, in order from the first side, a base portion 171 and a pin portion 172. The length of the safety valve body 142 along the axis L1 is set smaller than the length of the second hole portion 163 along the axis L1. Thus, when the pin portion 172 of the plug body 143 described later is removed from the third hole portion 164, the entire safety valve body 142 can be housed in the second hole portion 163.

The outside diameter of the base portion 171 is set substantially equal to the bore diameter of the second hole portion 163. The outside diameter of the pin portion 172 is set substantially equal to the bore diameter of the third hole portion 164. The end of the outer circumferential surface of the pin portion 172 on the second side is surrounded by the seal member 174. This provides a seal between the third hole portion 164 and the pin portion 172.

The safety valve biasing member 144 is, for example, a compression coil spring. The safety valve biasing member 144 is attached to the outer circumference of the pin portion 172. The safety valve biasing member 144 is disposed in a compressed state between the base portion 171 and a stepped portion between the second hole portion 163 and the third hole portion 164. Thus, the safety valve biasing member 144 biases the safety valve body 142 to the first side.

The plug body 143 is made of, for example, a fusible alloy. An example of the fusible alloy is a bismuth-indium-based alloy. The melting point of the plug body 143 is the threshold temperature. The plug body 143 is disposed at the end of the second hole portion 163 on the first side. The plug body 143 has, for example, a columnar shape with an outside diameter substantially equal to the bore diameter of the second hole portion 163. The length of the plug body 143 along the axis L1 is set so that the total length of the plug body 143 and the safety valve body 142 is larger than the length of the second hole portion 163. Thus, when the solid plug body 143 is disposed in the second hole portion 163, the third hole portion 164 is kept in a closed state by the pin portion 172. In another embodiment, the plug body 143 may be a glass bulb that breaks at the threshold temperature.

The fastener 145 has, for example, a stepped columnar shape. Specifically, the fastener 145 includes a columnar holding portion 181 that protrudes to the second side. The outside diameter of the holding portion 181 is set smaller than the outside diameter of a portion of the fastener 145 on the first side. External threads are provided on the outer circumferential surface of the holding portion 181. The fastener 145 is fixed to the safety valve housing 141 by screw fastening to the first hole portion 162, and closes the opening of the through hole 161 on the first side. The holding portion 181 abuts against the plug body 143. This prevents the safety valve body 142 and the plug body 143 from falling off from the second hole portion 163 due to the pressure of the hydrogen gas flowing into the third hole portion 164, that is, into the safety valve 14, via the inlet 165.

In the safety valve 14 structured in this way, when the temperature is equal to or lower than the threshold temperature, the third hole portion 164 is closed by the safety valve body 142. That is, the safety valve 14 is in the closed state. Therefore, even if the hydrogen gas in the gas tank 2 flows into the safety valve 14 through the inlet 165, the hydrogen gas is not released to the outside. When the temperature of the safety valve 14 exceeds the threshold temperature, the plug body 143 is fused and the safety valve body 142 is pushed into the second hole portion 163 by the pressure of the hydrogen gas and the biasing force of the safety valve biasing member 144. As a result, the third hole portion 164 is opened. That is, the safety valve 14 is in the open state. Therefore, the hydrogen gas that flows into the safety valve 14 from the third hole portion 164 is released to the outside via the second hole portion 163, the communication hole 166, and the release passage 97.

(Operations of Valve Assembly 1)

An operation of the valve assembly 1 when charging the hydrogen gas into the gas tank 2 will be described with reference to FIGS. 1 to 3. In this case, a pipe extending from a hydrogen gas supply source that is the external device 3 is connected to the joint 16. When the hydrogen gas is supplied from the external device 3 via the joint 16, the hydrogen gas flows into the check valve 15 via the first portion 33, the second portion 34, and the third portion 35 of the second flow passage 23. Then, the check valve body 102 moves to the first side by the pressure of the hydrogen gas, and the check valve 15 is brought into the open state. As a result, the first flow passage 22 communicates with the charging portion 31 of the first flow passage 22 via the lateral hole 115 and the space S of the check valve housing 101. Thus, the hydrogen gas is charged into the gas tank 2 via the charging portion 31.

At this time, the hydrogen gas also flows into the inlet 165 of the safety valve 14 via the space S and the communication passage 117. When the temperature of the safety valve 14 is not high, however, the safety valve 14 is in the closed state and therefore the hydrogen gas is not released to the outside. The hydrogen gas also flows into the composite valve 13 via the second portion 34 to the fourth portion 36 of the second flow passage 23. However, the check valve body 55 is pushed against the second opening 74 of the plug 52 by the pressure of the hydrogen gas and therefore the second opening 74 remains closed. Therefore, the function of the electromagnetic valve is not adversely affected due to action of the high-pressure hydrogen gas on the electromagnetic valve.

Next, an operation of the valve assembly 1 when feeding the hydrogen gas from the gas tank 2 will be described. In this case, a pipe extending from a fuel cell that is the external device 3 is connected to the joint 16. The hydrogen gas in the gas tank 2 flows into the composite valve 13 via the feeding portion 32 of the first flow passage 22. When electric power is supplied to the solenoid coil 81 as described above, the first opening 73 and the second opening 74 of the internal flow passage 71 in the plug 52 are opened. As a result, the hydrogen gas flows into the joint 16 via the fourth portion 36, the second portion 34, and the first portion 33 of the second flow passage 23, and is fed to the fuel cell.

Next, it is assumed that the temperature of the safety valve 14 becomes high and exceeds the threshold temperature. In this case, the plug body 143 of the safety valve 14 is fused and the safety valve 14 is brought into the open state. At this time, the hydrogen gas flows from the gas tank 2 into the inlet 165 of the safety valve 14 via the charging portion 31 of the first flow passage 22, the space S, and the communication passage 117. The hydrogen gas that has flowed into the safety valve 14 is released to the outside via the third hole portion 164, the second hole portion 163, the communication hole 166, and the release passage 97. This suppresses an excessive increase in the pressure in the gas tank 2.

Next, the functions and effects of the present embodiment will be described. (1) The integrated attachment hole 26 of the body 11 includes the first attachment hole 91 that is open in the third side surface 11*c* that is the outer surface of the body 11 and to which the safety valve 14 is attached, and the second attachment hole 92 that is open in the bottom surface of the first attachment hole 91 and to which the check valve 15 is attached. Since the second attachment hole 92 is open in the bottom surface of the first attachment hole 91 in this way, the second attachment hole 92 is disposed so as to be aligned linearly with the first attachment hole 91. Therefore, the structure of the body 11 can be simplified compared to, for example, a case where the first attachment hole 91 and the second attachment hole 92 are holes independent of each other. In addition, it is possible to suppress the concentration of stress caused by the pressure of the hydrogen gas at the connection portion between the first attachment hole 91 and the second attachment hole 92 compared to a case where the first attachment hole 91 intersects the second attachment hole 92. The inlet 165 of the safety valve 14 communicates with the inside of the gas tank 2 via the first flow passage 22 (charging passage) regardless of the open or closed state of the check valve 15. Therefore, when the temperature of the gas tank 2 becomes high, the hydrogen gas can be reliably released to the outside via the safety valve 14 as described above.

(2) The second attachment hole 92 is provided coaxially with the first attachment hole 91. Therefore, the first attachment hole 91 and the second attachment hole 92 can be formed more easily than in a case where the axis L2 of the second attachment hole 92 deviates from the axis L1 of the first attachment hole 91. Thus, it is possible to, for example, shorten the processing period for the body 11.

(3) The check valve 15 that restricts the flow of the hydrogen gas from the first flow passage 22 to the second flow passage 23 and allows the flow of the hydrogen gas from the second flow passage 23 to the first flow passage 22 is used as the other valve that controls the flow of the hydrogen gas in a manner different from that of the safety valve 14.

In the structure in which the second attachment hole 92 is open in the bottom surface of the first attachment hole 91, the other valve needs to be attached to the second attachment hole 92 via the first attachment hole 91. Therefore, a decrease in ease of assembling of the other valve is unavoidable compared to, for example, a case where the second attachment hole 92 is open in the outer surface of the body 11. In this regard, the check valve 15 is a valve having a relatively simple structure compared to, for example, an electromagnetic valve. Therefore, the check valve 15 can be easily attached to the second attachment hole 92 via the first attachment hole 91. Thus, it is possible to suppress the decrease in ease of assembling of the valve assembly 1.

(4) The first flow passage 22 is open in the inner circumferential surface of the second attachment hole 92, and the second flow passage 23 is open in the bottom surface of the second attachment hole 92. Therefore, the hydrogen gas flowing from the second flow passage 23 can be charged into the gas tank 2 more quickly than, for example, in a case where the first flow passage 22 is open in the inner circumferential surface of the first attachment hole 91.

(5) The check valve 15 includes the check valve housing 101 that defines the space S between the check valve housing 101 and the inner circumferential surface of the second attachment hole 92 and is fixed in the second attachment hole 92, and the check valve body 102 slidably housed in the check valve housing 101. The check valve housing 101 has the housing hole 113 that houses the check valve body 102 and communicates with the second flow passage 23, the lateral hole 115 that communicates the housing hole 113 with the space S, and the communication passage 117 that communicates the space S with the first attachment hole 91. The inlet 165 of the safety valve 14 communicates with the first flow passage 22 via the communication passage 117 and the space S.

In the above structure, the first attachment hole 91 communicates with the first flow passage 22 via the communication passage 117 of the check valve housing 101 fixed to the body 11. Therefore, the inlet 165 of the safety valve 14 can stably communicate with the first flow passage 22.

The present embodiment can be modified as follows. The present embodiment and the following modifications can be implemented in combination with each other in a technically consistent range.

- The check valve housing 101 is fixed in the second attachment hole 92 by screw fastening. However, the present disclosure is not limited to this. The check valve housing 101 may be fixed in the second attachment hole 92 by any fixing method such as press fitting. Similarly, the safety valve housing 141 may be fixed in the first attachment hole 91 by any fixing method such as press fitting. in addition, the fastener 145 may be fixed to the safety valve housing 141 by any fixing method such as press fitting.
  - The communication passage 117 includes the vertical passage 118 and the lateral passage 119, but the present disclosure is not limited to this. The communication passage 117 may have, for example, a linear shape inclined with respect to the axis L2 as long as it can communicate the charging portion 31 with the first attachment hole 91.
- The tubular space S is formed between the inner circumferential surface of the second attachment hole 92 and the outer circumferential surface of the check valve housing 101. However, the present disclosure is not limited to this. The shape of the space S need not be the tubular shape as long as the charging portion 31 of the first flow passage 22 can communicate with the first attachment hole 91.
- The check valve housing 101 and the safety valve housing 141 are structured as separate components. However, the present disclosure is not limited to this. The check valve housing and the safety valve housing may be structured as one seamless and continuous piece. That is, the safety valve 14 and the check valve 15 may share a single housing.
- The shape of the first attachment hole 91 may be changed as appropriate. For example, the first attachment hole 91 may have a substantially constant bore diameter over the entire length along the axis L1. That is, the first attachment hole 91 need not be the stepped hole but may be a simple circular hole. The shape of the second attachment hole 92 may be changed as appropriate. The second attachment hole 92 may be, for example, a stepped hole. Further, the bore diameter of the first attachment hole 91 and the bore diameter of the second attachment hole 92 may be substantially the same.

A valve subassembly other than the check valve 15, such as an excess flow check valve or an electromagnetic valve, may be used as the other valve.

The charging portion 31 of the first flow passage 22 is open in the inner circumferential surface of the second attachment hole 92. However, the present disclosure is not limited to this. For example, the charging portion 31 may be open in the inner circumferential surface of the first attachment hole 91 closer to the bottom surface.

The axis L2 of the second attachment hole 92 need not coincide with the axis L1 of the first attachment hole 91. That is, the second attachment hole 92 need not be provided coaxially with the first attachment hole 91.

The valve assembly 1 controls the flow of the high-pressure hydrogen gas. However, the present disclosure is not limited to this. The valve assembly 1 may control the flow of a gas other than the hydrogen gas.

The invention claimed is:

1. A valve assembly comprising:

a body; and a plurality of valve subassemblies configured to be attached to the body, wherein the plurality of valve subassemblies includes:

a safety valve having an inlet and configured to release a gas flowing into the inlet to an outside when a temperature of the safety valve exceeds a threshold temperature; and another valve configured to control a flow of the gas in a manner different from a manner of the safety valve, the body includes:

a gas flow passage including a first flow passage connected to a gas tank and a second flow passage connected to an external device; and an integrated attachment hole that communicates with each of the first flow passage and the second flow passage, the integrated attachment hole includes:

a first attachment hole that is open in an outer surface of the body and is configured such that the safety valve is attached; and a second attachment hole that is open in a bottom surface of the first attachment hole and is configured such that the other valve is attached, the integrated attachment hole is open in the outer surface of the body only at the first attachment hole, and the inlet is configured to communicate with the first flow passage regardless of an open or closed state of the other valve.

2. The valve assembly according to claim 1, wherein the second attachment hole is provided coaxially with the first attachment hole.

3. A valve assembly comprising:

a body; and a plurality of valve subassemblies configured to be attached to the body, wherein the plurality of valve subassemblies includes:

a safety valve having an inlet and configured to release a gas flowing into the inlet to an outside when a temperature of the safety valve exceeds a threshold temperature; and another valve configured to control a flow of the gas in a manner different from a manner of the safety valve, the body includes:

a gas flow passage including a first flow passage connected to a gas tank and a second flow passage connected to an external device; and an integrated attachment hole that communicates with each of the first flow passage and the second flow passage, the integrated attachment hole includes:

a first attachment hole that is open in an outer surface of the body and is configured such that the safety valve is attached; and a second attachment hole that is open in a bottom surface of the first attachment hole and is configured such that the other valve is attached, the inlet is configured to communicate with the first flow passage regardless of an open or closed state of the other valve, and the other valve is a check valve configured to restrict the flow of the gas from the first flow passage to the second flow passage and allow the flow of the gas from the second flow passage to the first flow passage.

4. The valve assembly according to claim 3, wherein the first flow passage is open in an inner circumferential surface of the second attachment hole, and the second flow passage is open in a bottom surface of the second attachment hole.

5. The valve assembly according to claim 4, wherein the check valve includes:

a housing configured to define a space between the housing and the inner circumferential surface of the second attachment hole, and fixed in the second attachment hole; and a valve body slidably housed in the housing, the housing includes:

a housing hole that houses the valve body and communicates with the second flow passage;

a lateral hole that communicates the housing hole with the space; and a communication passage that communicates the space with the first attachment hole, and the inlet communicates with the first flow passage via the communication passage and the space.

* * * * *